J. L. MILTON.
ELECTRIC SUPPLY AND CONTROL SYSTEM.
APPLICATION FILED MAY 15, 1914.
1,200,213.
Patented Oct. 3, 1916.
2 SHEETS—SHEET 1.
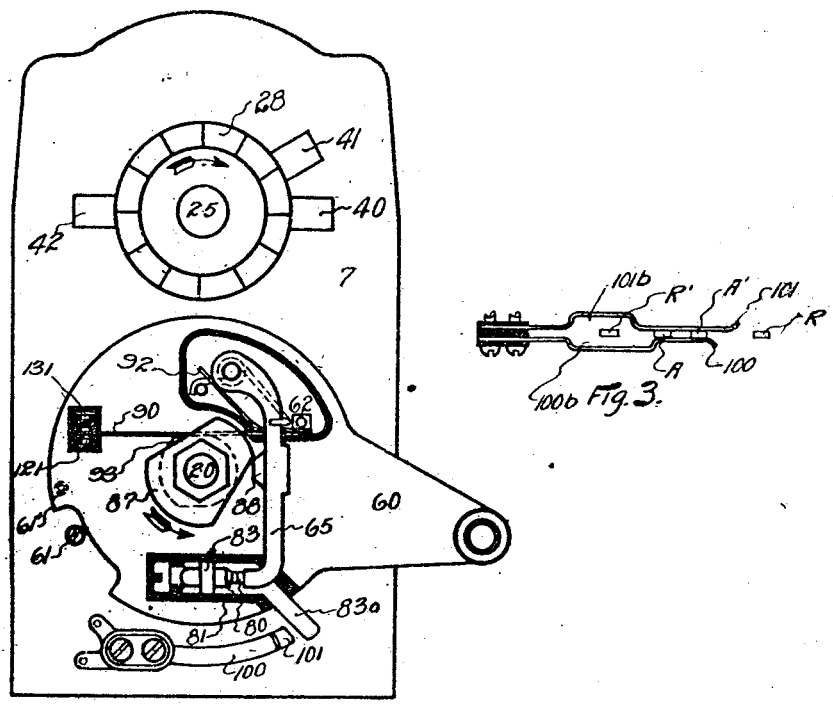
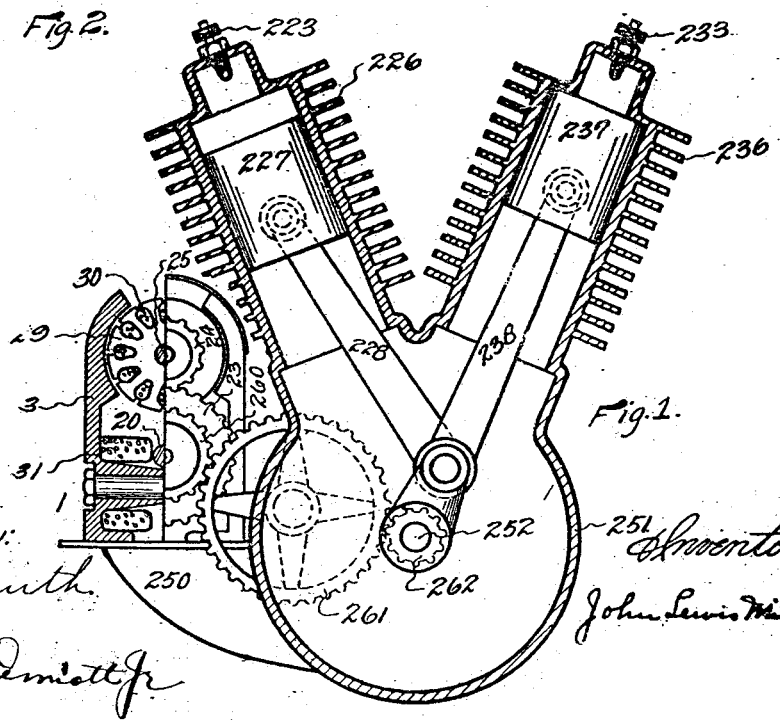

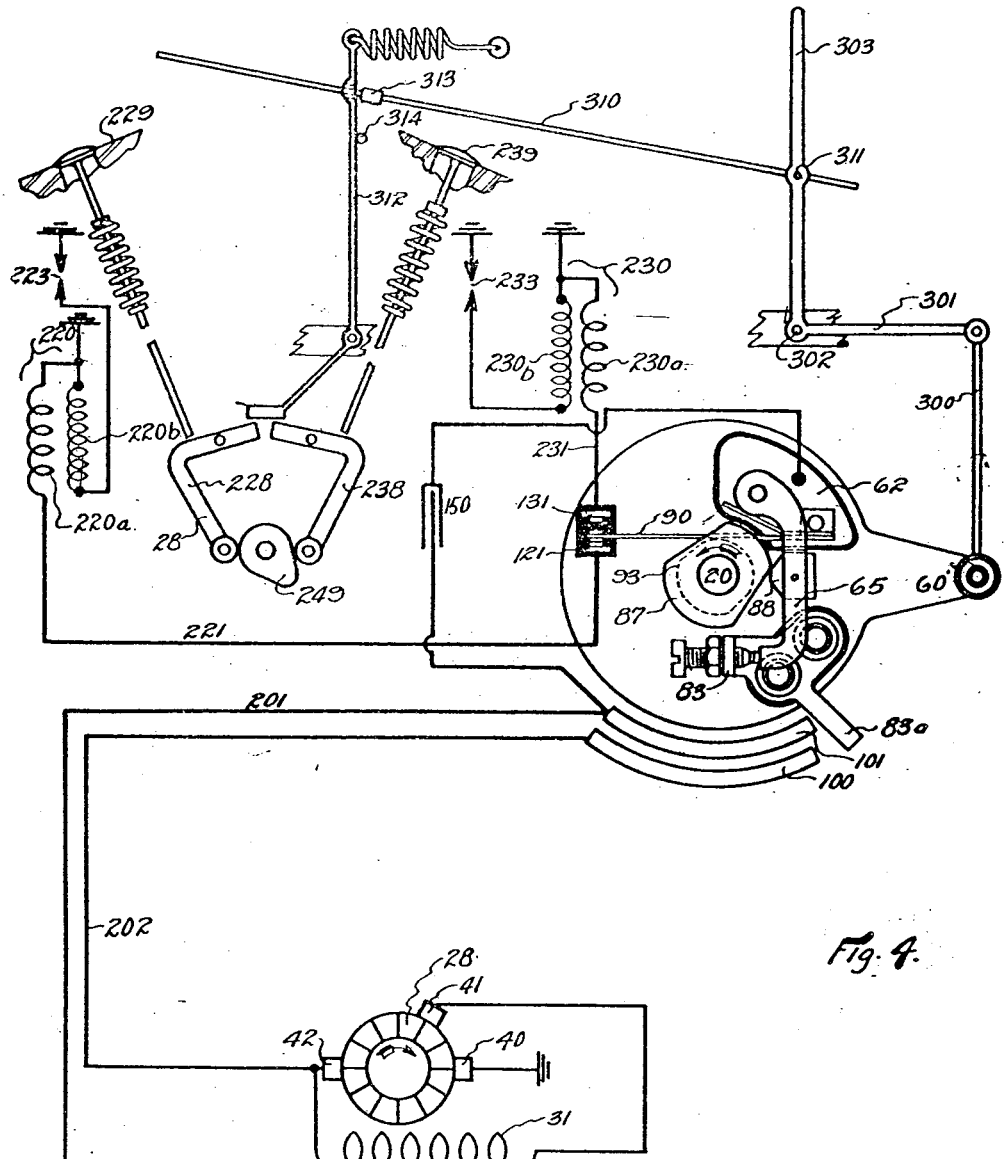

UNITED STATES PATENT OFFICE.

JOHN LEWIS MILTON, OF ANDERSON, INDIANA, ASSIGNOR TO MOTOR IGNITION & DEVICES COMPANY, A CORPORATION OF WEST VIRGINIA.

ELECTRIC SUPPLY AND CONTROL SYSTEM.

1,200,213.  Specification of Letters Patent.  Patented Oct. 3, 1916.

Application filed May 15, 1914. Serial No. 838,651.

*To all whom it may concern:*

Be it known that I, JOHN L. MILTON, a citizen of the United States, residing at Anderson, in the county of Madison and State of Indiana, (whose post-office address is care of the Remy Electric Company, Anderson, Indiana,) have invented a new and useful Electric Supply and Control System, of which the following is a specification.

My invention relates to systems for supplying electricity used in connection with internal combustion engines for furnishing electricity for the ignition of such engines and also for operating other electrical apparatus, such as lights. I have developed this system especially for use on vehicles propelled by internal combustion engines, in particular, motorcycles, although I am aware that the invention may be applied to a variety of other uses.

In my system I preferably employ a generator, which, in connection with a storage battery, furnishes the electricity for the ignition of engine, and also for the lights, and other electrical equipment. The storage battery is charged by the generator when the output of the generator is sufficiently great, and carries a part or all of the load when the generator is at rest or running slowly. This interaction between the generator, storage battery, and load, is similar to that of the electrical lighting and ignition equipment now in general use on gasolene propelled vehicles.

An object of my invention is to eliminate the relay commonly used on similar systems for supplying electricity for the purpose of preventing the battery from discharging through the generator, when the generator is at rest or running slowly.

Still another object is to provide a common controlling means, preferably manually operated, for advancing and retarding the ignition, for rendering the ignition circuit inoperative at certain times, and for controlling the compression release of the internal combustion engine.

This generator contains, in a single unit, not only the generator proper, but also the timer and certain circuit controlling means. If desired however, these various elements may form two or more units, and other types of generator, timer and control mechanism may be used.

I employ a timer, including, in accordance with common practice, a member normally stationary, but adjustable about the axis of the timer shaft for the purpose of advancing or retarding the spark.

The methods of control which form a part of my invention are obtained by associating with this adjustable timer member, circuit controlling means for controlling the connection between the generator and the storage battery, and preferably also for rendering the ignition circuit inoperative under certain conditions. The advancing and retarding of the spark by this adjustable member is performed preferably by a manually operated controlling means which may also be arranged to relieve the compression of the engine for starting either by raising the exhaust valve or opening relief cocks or by any other suitable means.

Referring to the drawings: Figure 1 represents an internal combustion engine, to which is attached the generating unit forming the principal part of my invention, a portion of the generating unit being shown in section. Fig. 2 is a view of the opposite end of the generator from that shown in Fig. 1, portions which are unnecessary for showing the electrical actions involved, being omitted. Fig. 3 is a detail of the hereinafter described circuit controlling means as seen from above. Fig. 4 shows the electrical circuits together with the compression relief controlling means.

Referring to Fig. 1, 1 represents the generator mounted on a bracket 250, which is integral with the crank case 251 of the engine. Said generator is geared to the crank shaft 252 of this engine by means of gear 260 attached to the generator shaft 20, gear 261 meshing with said gear 260, and gear (262), attached to said crank shaft (252). There are also shown the respective cylinders (226) and (236), pistons (227) and (237) and connecting rods (228) and (238), spark plugs (223) and (233) of the engine. There is also shown a gear (23) attached to the shaft (20) and meshing with a pinion (24) attached to the rotor shaft (25). Said shaft (25) carries the rotor of a generator, this rotor being preferably the well known direct current armature of the ordinary form, having a core (29) and winding (30). The field portion of the generator is composed of the yoke (3) and winding (31).

Referring now to Fig. 2 there is shown on the shaft (25), the commutator (28) against which rest the stationary brushes (40, 41 and 42). There is a timer disk (60), revoluble about the shaft (20), throughout a portion of a revolution. Said disk is normally stationary, that is to say it does not rotate with the shaft (20). But may be turned through a portion of the revolution for the purpose of varying the time of ignition and actuating the circuit controlling mechanism. Said timer disk (60) has attached thereto a plate (62), said plate being insulated from said timer disk. Pivoted to said plate are two levers (65 and 90). Said levers are electrically connected to one another through said plate, but are insulated from the frame of the machine. Said timer disk also carries a contract bracket (83) which is also insulated from said timer disk. The contact lever (65) carries a contact (80) adapted to engage a contact (81) associated with the bracket (83). There is a cam (87) attached to the end of the shaft (20) for the purpose of actuating said lever (65). To prevent electrical connection being made between said lever and said cam, there is a fiber piece (88), attached to said lever, against which the cam acts. There is also a spring for moving said lever (65) so as to cause engagement of the contacts (80 and 81), except at such times as the contacts are separated by said cam (87). There are two contacts (121 and 131) attached to the timer disk (60), but insulated therefrom, between which the free end of lever (90) plays. There is a spring (92) associated with said lever, tending to force it downwardly into engagement with the contact (121). There is a cam (93) attached to the shaft (20), behind the cam (87) and adapted to cause the lever (90) to oscillate, whereby at certain times said lever is caused to engage the contact (121) and at other times to engage the contact (131). In order to prevent grounding of the lever (90) through the cam (93), said cam is made of insulating material, such as fiber.

The sparks for the ignition of the internal combustion engine are produced by the interruption of a current by the interrupter contacts (80 and 81). Accordingly the time of ignition can be varied in the well known manner, that is, by turning the timer disk and associated parts in the direction of the rotation of shaft (20) to retard the ignition, and in the opposite direction to advance the ignition. When the timer disk is rotated as far as the stop, here-in-after mentioned, permits, in the direction of the rotation of the timer shaft (20), it is said to be in the fully retarded position, although, as will be explained later, no sparks are produced with the timer in this position.

Attached to the end plate (7) of the generator are two stationary springs (100 and 101), which are insulated from each other and from the frame. The tongue (83ª), which is an extension of the bracket (83), is adapted to engage one or both of these springs when the timer disk (60) is in certain positions, whereby one or both of said springs are connected to the contract (81). The motion of the timer disk (60) is limited by the screw (61), inserted in the generator end plate (7). When said disk is rotated in a counter-clockwise direction as far as said screw permits, the position of the tongue (83ª) with relation to the springs (100 and 101) is shown by R, Fig. 3. As the timer disk and associated parts are rotated in a clockwise direction, the tongue (83ª) first engages the spring (101) and after further movement it engages also the spring (100). The stop limits the motion of the timer disk so that the tongue (83ª) cannot pass beyond the position A, Fig. 7. The shape of the springs (100 and 101) is such that the tongue (83ª) in passing from the position R to the position A does not become separated from either of the springs after having engaged them. With this arrangement, the machine is suited for counter clockwise rotation of the shaft (20), as indicated by the arrow. Rotation of the timer disk and associated parts in a direction opposite to the rotation of the shaft causes the separation of the timer contacts (80 and 81) (Fig. 2) to take place earlier. This advances the ignition in the well known manner, for, as will be explained later, the separation of these contacts causes the ignition to take place. Referring again to Fig. 3, A, then, is the position of the tongue, (83ª) in the fully advanced position, and R is its position in the fully retarded position of the timer.

From what has been said above, it is evident that advancing the timer first establishes a connection between the tongue (83ª) and the spring (101), and further advancing also closes the circuit between said tongue and the spring (100).

Should it be desired to employ the generator where it is necessary to drive the shaft (20) in a clockwise direction, the stop or screw (61) is removed from the position shown in Fig. 2, and put in the hole (61'). With the stop thus changed, the range of motion of the timer disk (60) is such that the tongue (83ª) may move between the positions A' and R' of Fig. 7. When turned as far as possible in a clockwise direction (which for clockwise rotation of the shaft (20), is the fully retarded position) the tongue (83ª) occupies the position R'. Due to the recesses (100ᵇ and 101ᵇ) in the respective springs, said tongue does not engage either of said springs. As the timer disk is turned in a counter-clockwise direction, that is, advanced (for clockwise rotation of the shaft) (20) the tongue (83ª) first engages the spring (101) and then the spring (100). Thus the sequence of connections occurring during advancing of the timer is the same as was previously the case when the apparatus was arranged for counterclockwise rotation of the shaft (20).

Referring to Fig. 4, there is shown the timer disk (60), connected by a rod (300) to a bell crank (301). Said bell crank is pivoted at (302) and has a handle (303) for the purpose of manipulation. Thus by means of the handle (303), the timer disk (60) can be rotated for the purpose of varying the time of the spark in the well known manner. In the particular arrangement shown, wherein the shaft (20) rotates in a counter-clockwise direction, the spark is retarded by moving said handle to the left and advanced by moving it to the right, but when the handle is moved far to the left, it entirely interrupts the ignition as will be explained more fully. By means of a push rod (310) pivoted to said bell crank (301) by means of a pivot (311), motion is imparted to a spring actuated lever (312) through a collar (313) attached to said rod (310). Said rod (310) slides in a hole in lever (312) and moves lever (312) only when the collar (313) abuts said lever. By this arrangement lever (312) is pushed away from its stop (314) only when said lever (303) is moved far to the left. The exhaust cam (249), forming a part of the engine, acts on cam levers (228 and 238) whereby motion is communicated to the exhaust valves (229 and 239), by means of cam levers (228 and 238) respectively. The bottom portion of the lever (312) is so shaped as to form a toe whereby, when this lever is displaced from its normal position, it actuates said cam levers (228 and 238) so as to open the respective exhaust valves (229 and 239). Regardless of the positions of the cam (249), when the lever (303) is in its extreme left hand position, the exhaust valves are raised, and the compression of the engine is relieved. Instead of this means of relieving the compression other suitable means may be employed as will be evident to one skilled in the art. This might, for example, be accomplished by suitably associating the spark advancing means with relief cocks, providing a communication between the inside of the cylinder and the outside atmosphere.

There is shown the commutator (28) of the generator, and the field winding (31) connected to the brushes (41 and 42). There is also shown a storage battery (200), one terminal of which is connected to the brush (40) through both of said parts, being grounded to the engine frame. The other terminal of said storage battery is connected by wire (201) to the spring (101). The brush (42) is connected by wire (202) to the spring (100). When the timer disk is advanced sufficiently to cause the tongue (83ª) to engage both springs (100 and 101), the connection is completed between the ungrounded terminal of the storage battery and the brush (42). The generator, when in operation, can then charge the storage battery. While the particular circuits within the generator are not essential, I show the employment of an auxiliary brush for one end of the field winding. I have found this to give satisfactory regulation. There are ignition coils (220) and (230) respectively, having primary windings (220ª and 230ª) respectively, and secondary windings (220ᵇ and 230ᵇ) respectively. One terminal of each of these four windings is grounded. The remaining terminal of the primary windings (220ª and 230ª) are connected by wires (221 and 231) to the contacts (121 and 131) respectively, and the remaining terminal of the secondary windings (220ᵇ and 230ᵇ) are connected to the respective spark plugs (223 and 233). There is a condenser (150) connected to the plate (62) and the spring (101). There is shown a light (350), controlled by switch (351), connected to the storage battery (200). Said light may be operated regardless of the condition of the generator and associated parts, or of the switch (360).

The operation of the system is as follows: Assume that the engine and generator are at rest. The handle (303) should be sufficiently far toward the left to separate the tongue (83ª) from the spring (101), thereby preventing a discharge of the storage battery through the ignition circuit or the generator. To start the engine the handle (303) is moved to its extreme left position, whereby the compression is relieved. The engine is then turned over by cranking or pedaling, or otherwise until it has attained sufficient momentum to drive it over the compression stroke. The handle (303) is then moved sufficiently to the right to cause engagement of the tongue (83ª) and the spring (101) and to stop the action of the compression release device. The engine should then start, receiving ignition as follows: Current flows from the ungrounded side of the battery through wire (201), spring (101), tongue (83ª), contacts (81 and 80), lever (65), plate (62), and distribution lever (90) to one of the contacts (121) or (131). Assuming it to be (121), the current then flows to wire (221) and primary winding (220ª) to ground, whence it returns to the grounded side of the battery. This takes place only when the contacts (80 and 81) are in engagement, at the time that these contacts become separated by the action of the cam (87), the circuit is interrupted and a spark produced at the spark plug (223) in the well known manner. The condenser (150) is in parallel with the contacts (80 and 81) for the well known purpose. The cam (93), by its action on the lever (90), causes said lever to be connected alternately to contacts (121 and 131), whereby the sparks are delivered alternately to the spark plugs (223 and 233). When a retarded spark is required, as is the case when the engine is running slowly, the tongue (83ª) has not moved sufficiently to the left to cause engagement between it and the spring (100), thereby avoiding the possibility of the storage battery discharging itself through the generator at slow speeds of operation. As the spark is advanced, the tongue (83ª) engages the spring (100), thereby completing the connection between the spring (100) and the spring (101). When operating with an advanced spark the engine is driving the generator fast enough to charge the storage battery, and advancing the spark completes the circuit between said battery and generator. When it is desired to stop the engine the lever (303) is moved sufficiently far to the left to separate the tongue (83ª) from the contact (101), thereby rendering the ignition circuit inoperative, and if desired, said lever (303) may be moved still farther to the left so as to relieve the compression. This last named movement is particularly desirable when it is desirable to allow a motorcycle to coast without power being supplied by the engine.

In the foregoing specifications I have described a particular embodiment of my invention, but I do not limit myself to the specific form herein shown, as there are many changes which may be made by one skilled in the art, without departing from the spirit thereof.

I claim as my invention:

1. An electric supply and control system, including, in combination, a generator, an ignition circuit, a timer having a revoluble member and an adjustable member, and adapted to periodically open and close said ignition circuit, and means integral with said adjustable member for rendering said ignition circuit inoperative when said adjustable member occupies certain positions by opening said ignition circuit at some point other than where it is periodically opened and closed by said timer.

2. An electric supply and control system, including, in combination, an ignition circuit, a generator, a timer having a revoluble member and an adjustable member, said timer being adapted to periodically open and close said ignition circuit, and means integral with said adjustable member for rendering said ignition circuit inoperative when said adjustable member occupies the fully retarded position, by opening said ignition circuit at some point other than where it is periodically opened and closed by said timer.

3. An electric supply and control system including, in combination, a generator, a timer having an adjustable member, a storage battery, a circuit connecting said generator and said storage battery, and a switch controlling said circuit, said switch being associated with the adjustable member of said timer.

4. An electric supply and control system including, in combination, a generator, a timer having an adjustable member, a storage battery, a circuit connecting said generator and storage battery, and a switch controlling said circuit, said switch being associated with the adjustable member of said timer, and adapted to close said circuit when said adjustable member occupies positions remote from the fully retarded position.

5. An electric supply and control system including in combination, a generator, a storage battery, an ignition circuit, a circuit connecting said generator and said storage battery, a timer having an adjustable member and circuit controlling means associated with said adjustable member and adapted to render said ignition circuit inoperative when said adjustable member occupies a certain predetermined position, and adapted to render the circuit between said generator and said storage battery inoperative, when said adjustable member occupies a certain predetermined position.

6. An electric supply and control system including the combination with an internal combustion engine, of a generator, a storage battery, a circuit connecting said storage battery, a timer having an adjustable member, a switch associated with said adjustable member and controlling the circuit between said generator and said storage battery, a compression relief for said internal combustion engine, and a common controlling means for said adjustable member and said compression relief.

7. An electric supply and control system including the combination with an internal combustion engine, of a generator, an ignition circuit for said internal combustion engine, a storage battery, a circuit connecting said generator and said storage battery, a timer having an adjustable member, circuit controlling means associated with said adjustable member adapted to render said ignition circuit inoperative when said adjustable member occupies a certain predetermined position and adapted to open the circuit between said generator and said storage battery when said adjustable member occupies a certain predetermined position, a compression relief for said internal combustion engine and a common controlling means for said adjustable member and said compression relief.

8. An electric supply and control system including the combination, with a generator having a generating rotor, a timer shaft geared to said rotor, an adjustable timer member and circuit controlling means depending on the position of said adjustable timer member, of a storage battery, a circuit connecting said storage battery and said generator controlled by said circuit controlling means, and an ignition circuit controlled by said timer and said circuit controlling means.

9. An electric supply and control system, including in combination, a generator having a generating rotor, and a timer shaft geared thereto, of a storage battery adapted to be connected to said generator, an internal combustion engine, compression relief mechanism therefor, an ignition circuit for said internal combustion engine, and a common means for controlling the supply of electricity to said ignition circuit, the connection between said generator and said storage battery, and the compression relief of said internal combustion engine.

10. An electric supply and control system including, in combination, a storage battery, an ignition circuit, a generator adapted to charge said storage battery, and a switch controlling the supply of electricity to said ignition circuit and controlling the energy supplied by said generator to said storage battery.

11. In an electric supply and control system, the combination with an internal combustion engine, of compression relief mechanism therefor, a generator, a storage battery, a circuit connecting said generator and said storage battery, an ignition circuit, and a common controlling means for the circuit between said generator and said storage battery, said ignition circuit and the compression relief of said internal combustion engine.

12. An electric supply and control system, including in combination, a timer having an adjustable member, a contact associated with said adjustable member, a second contact associated with some part other than said adjustable member and adapted to be engaged by said first named contact when said adjustable member occupies certain positions, a means for limiting the range of adjustment of said adjustable member, said means being capable of a plurality of arrangements, one of said arrangements permitting said contacts to engage when said adjustable member is moved to the limit of its range in a clockwise direction and to become separated when said adjustable member is moved to the limit of its range in a counterclock-wise direction, and another of said arrangements permitting said contacts to engage when said adjustable member is moved to the limit of its range in a counter clockwise direction and to become separated when said adjustable member is moved to the limit of its range in a clockwise direction.

13. An electric supply and control system including, in combination, a timer having an adjustable member, timer contact points associated integrally with said adjustable member, means for causing the periodic engagement and separation of said contact points, and two slidable contacts integrally associated with said adjustable member for transmitting current to or from said contact points for periodic interruption.

14. An electric supply and control system including, in combination, a timer having an adjustable member, timer contact points associated with said adjustable member, means for causing the periodic engagement and separation of said contact points, two slidable contacts integrally associated with said adjustable member for transmitting current to or from said contact points for periodic interruption, one or more induction coils apart from said timer, one or more distributer contact points associated with said timer, an electrical connection between the primary winding of each of said induction coils and one of said distributer contact points, and a means for periodically connecting said coils through said distributer contact points in succession.

15. An electric supply and control system including, in combination, a plurality of sources of electricity, a contact connected to each of said sources, a timer having an adjustable member, said adjustable member including a contact adapted to slidingly engage the aforesaid contacts and including an integral means for periodically interrupting an electric circuit.

Anderson, Indiana, May 8, 1914.

JOHN LEWIS MILTON.

Witnesses:
  A. W. SHAW,
  F. P. McDERMOTT, Jr.